Patented July 20, 1926.

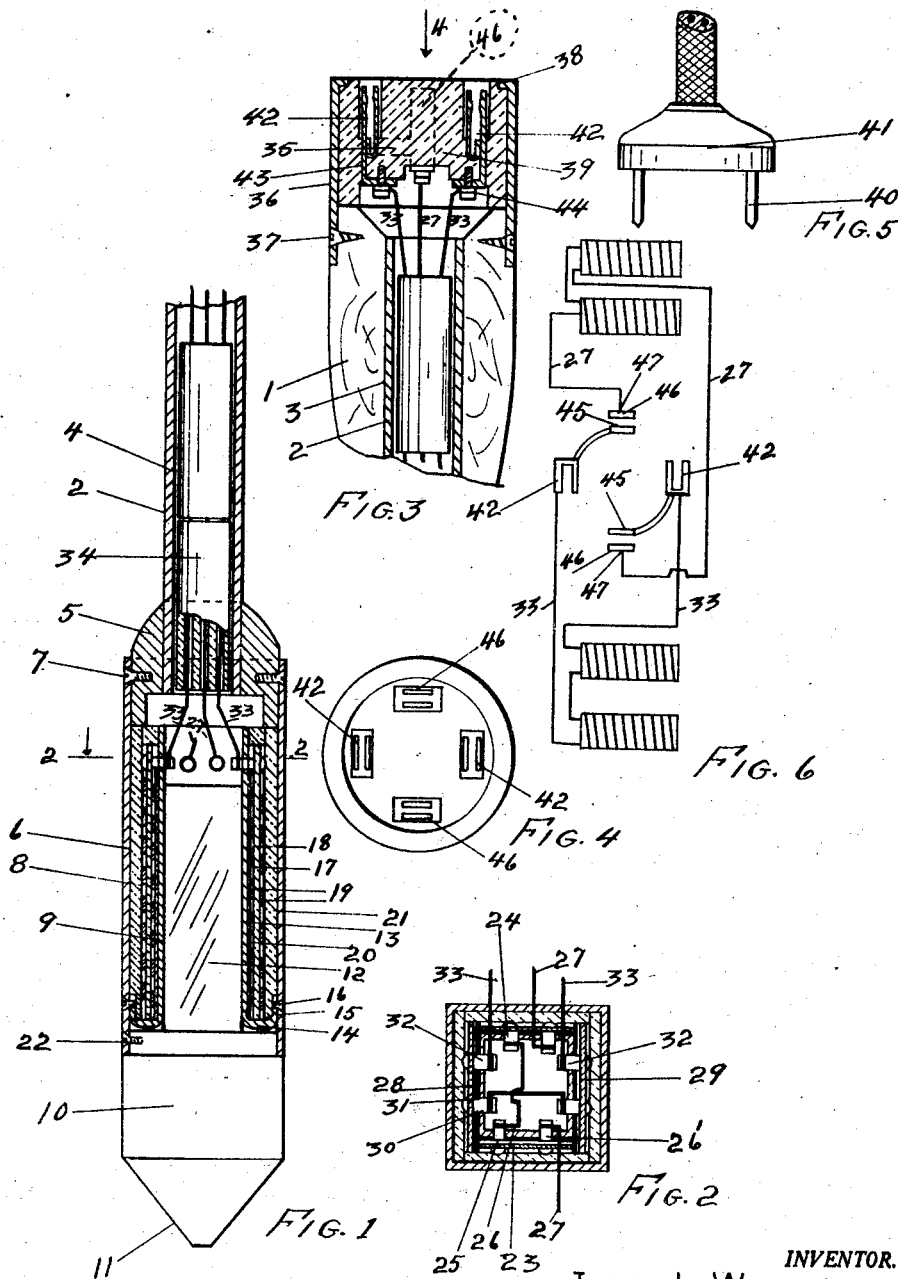

1,593,281

UNITED STATES PATENT OFFICE.

JAMES L. WOOD, OF OAKLAND, CALIFORNIA.

SOLDERING IRON.

Application filed April 6, 1925. Serial No. 20,905.

My invention is an electric soldering iron of the type in which the soldering point is readily removable and the electric heating elements may be readily withdrawn from the iron for repairing or renewing. I provide an iron preferably rectangular in section in which the soldering point has a stem passing between longitudinally placed heating elements. These elements in effect form four sides of a rectangular socket, opposite elements being connected in series and the wiring being such that the two pair may be connected in parallel. By this arrangement I obtain two heats. A plug having two sets of terminals situated at the end of the handle is designed to form an electric connection with a co-operative two-terminal plug. The series, or parallel circuit is obtained according to whichever sockets the plug is inserted into.

My invention will be more readily understood from the following description considered with the drawings in which Figure 1 is a section longitudinally of my soldering iron, showing the removable point, the detachable heating element and part of the handle with an insulating conduit therethrough. Figure 2 is a cross-section of Figure 1, on the line 2—2, showing the heating elements and their respective electrical connections and terminal binding posts.

Figure 3 is a longitudinal section of the handle end showing the electrical socket for the detachable plug. This illustrates the socket as being readily removable from the handle.

Figure 4 is an end view of Figure 3 in the direction of the arrow 4, showing the electric sockets.

Figure 5 illustrates an ordinary electric plug to co-operate with the sockets of Figures 3 and 4.

Figure 6 is an electrical diagram illustrating the heating elements and the manner of connecting a pair of these in series or the two pair in parallel.

Referring particularly to Figures 1 and 2, a soldering iron handle 1 preferably of wood, has a metal tube 2 extending therethrough reinforcing the handle at the part 3 and forming a shank at the part 4, connected to a block 5 at the solder-iron end. This block is preferably welded or brazed to the tube 2. A rectangular sleeve 6 is secured to the block 5 by screws 7 and forms a housing for the electrical heating elements 8 and their insulation, these latter being arranged to form a rectangular socket 9 for the solder-point 10, this point having a soldering tip 11 and a stem 12 fitting in the socket.

The mounting for the heating elements is as follows:—A metal ferrule 13, (see Figures 1 and 2) is rectangular in cross-section and of considerable length. It has either two or its four sides bent outwardly at the lower end, forming a flange 14, and a return bend 15 through which are secured screws 16 to hold the ferrule and the heating elements in the sleeve 6. Each heating element 17 comprises a mica or other insulating plate 18, with coiled wiring 19 thereabouts. A thin sheet of mica or other insulator 20, separates the heating element from the ferrule 13 and a thick insulating plate 21 of asbestos or the like separates the heating elements on the outside from the sleeve 6. Each of the four sides, formed by four individual heating elements and the insulating plates form the heating unit, the ferrule 13 forming the socket 9 for the solder point 10, this latter being securely held to the lower end of the sleeve 6 by the screw 22.

The electrical connections of the heating elements is as follows, having reference particularly to Figures 1, 2, and 6, one pair of elements 23 and 24 have binding posts 25 and a lead 26 connecting them in series. They also have binding posts 26' connecting to the feed wires 27, leading to the electric socket at the end of the handle. The other pair of heating elements 28 and 29 have binding posts 30 and a lead 31 connecting them in series. These also have binding posts 32 connecting to feed wires 33. These wires 27 and 33 are carried by an insulating conduit 34 to the electrical socket 35.

This socket 35, shown in Figure 3, is constructed with a casing 36, fastened to the wooden handle 1 by the screws 37, and having an in-turned flange 38 to hold the porcelain insulator 39 in place. Any type of socket which will give a single circuit through opposite heating elements in series and in another position of connecting the prongs 40 of the electric plug 41, will give a parallel connection through the two sets of opposite heating elements, would probably be satisfactory.

The electric socket shown has the opposite terminals 42 connecting directly by the strips 43 to the binding posts 44 of the feed wires 33. These terminals likewise lead to one side 45 of the opposite terminals 46, as shown diagrammatically in Figure 6 and dotted in Figure 3. The outside of 46, numbered 47, is connected to the wires 27. It will therefore be seen that if the prongs 40 connected to the terminals 42, the lead for the electric circuit is through one pair of heating elements. If the prongs are connected to the terminals 46, the electric circuit will be through the two opposite pair of heating elements in parallel. In this manner I may readily increase or decrease the temperature of the soldering point by merely changing the connection of the plug 41 and the electric socket 35.

From the above description it will be seen that the soldering point 10 may readily be removed from the socket 9 by removing the screw 22. In many cases this latter may be dispensed with. The rectangular sleeve 6 may be removed from the block 5 by removal of the screws 7 and hence the electric leads 33 and 27 connected and disconnected from the heating elements. The metal ferrule 13, with the heating elements attached, may be withdrawn from the sleeve 6 by removing the screws 16. Also the socket 35 may be readily removed from the handle by removing the screws 37 for connecting and disconnecting the leads 27 and 33.

The heat will be readily transferred from the heating elements to the stem 12 of the solder point and conducted to the tip 11. It is manifest that my soldering iron may be considerably changed in dimensions and shape to suit special work or circumstances of use without departing from the spirit thereof.

Having described my invention what I claim is:—

1. An electric soldering iron comprising a soldering point, a plurality of separate heating elements spaced around said soldering point and adapted to transmit heat thereto, means for selectively connecting a plurality of sets of the heating units in parallel or the separate units in series to a source of current supply whereby the heat transmitted to said soldering point may be regulated.

2. An electric soldering iron comprising in combination a handle, a socket at the end of the handle, a solder point having a stem fitting within said socket, a plurality of separate electrical heating elements spaced around the socket and adapted to transmit heat therethrough to the stem of the soldering point, electric leads from said elements, a switching device terminating said leads and a plurality of terminals in said switching device adapted to place a plurality of heating units in series or a plurality of sets of heating units in parallel.

3. An electric soldering iron comprising in combination a handle, a metallic tube extending therefrom, a sleeve connected to the end of said tube, said sleeve being rectangular in cross-section, a metal ferrule having an outwardly turned flange and a returned bend at its outer end, means to connect the said returned bend to the sleeve, a plurality of separate electric heating elements mounted on plates, secured to said ferrule from its inner end, inside thereof, insulating plates between the heating elements and the ferrule and the heating elements and the sleeve, and electric leads connecting opposite plates in series and electric leads extending from each pair of heating elements through the said tube and the said handle, said ferrule forming a socket in which a stem of a soldering point may be inserted for heating.

4. An electric soldering iron as claimed in claim 3 having in addition an electric socket at the end of the handle, terminals for the electric leads through the handle, said socket having four terminal sockets spaced rectangularly and adapted to form with prongs of an electric plug, a switching device to couple an opposite pair of heating elements in the circuit in series or the said pair and the remaining pair in parallel, the second mentioned pair of elements being also connected in series.

In testimony whereof I affix my signature.

JAMES L. WOOD.